United States Patent [19]
Stewart

[11] Patent Number: 5,820,061
[45] Date of Patent: Oct. 13, 1998

[54] ATTACHMENT FOR REEL-TO-REEL FILM MAKE-UP BENCH

[76] Inventor: Jack W. Stewart, 11597 Valley Ct., DeMotte, Ind. 46310

[21] Appl. No.: 848,144

[22] Filed: Apr. 28, 1997

[51] Int. Cl.$^6$ .............................. B65H 18/10; B65H 23/06
[52] U.S. Cl. .................................... 242/421.8; 242/538.2; 352/129
[58] Field of Search ............................. 242/421.8, 421.9, 242/527, 527.5, 527.6, 538.2, 538.3; 352/129

[56] References Cited

U.S. PATENT DOCUMENTS

| | | | |
|---|---|---|---|
| 1,734,142 | 11/1929 | McLaughlin et al. | 242/538.2 |
| 2,231,383 | 2/1941 | Goldberg | 242/527 |
| 3,002,703 | 10/1961 | Hinchman | 242/538.2 |
| 3,532,284 | 10/1970 | Burgardt et al. | |
| 3,679,147 | 7/1972 | Kittredge | |
| 3,780,959 | 12/1973 | Burth | |
| 3,823,890 | 7/1974 | Potts | |
| 3,826,443 | 7/1974 | Goodley | 242/421.9 |
| 3,856,389 | 12/1974 | Gardner | 352/129 |
| 4,052,023 | 10/1977 | Schultz | 242/538.2 |
| 4,150,386 | 4/1979 | Kirkpatrick | 242/421.8 |
| 4,152,053 | 5/1979 | Menary | 352/129 |
| 4,208,018 | 6/1980 | Wilkinson | |
| 4,219,259 | 8/1980 | Olodort | 352/129 |
| 4,240,593 | 12/1980 | Bell et al. | |
| 4,397,532 | 8/1983 | Webb | 242/538.2 |
| 4,676,370 | 6/1987 | Rudick | |
| 4,754,878 | 7/1988 | Bose | |
| 4,967,975 | 11/1990 | Urlik | |
| 5,151,725 | 9/1992 | Liljegren et al. | 352/129 |
| 5,252,170 | 10/1993 | Schaupp | |

Primary Examiner—John M. Jillions
Attorney, Agent, or Firm—Gary M. Hartman; Domenica N. S. Hartman

[57] ABSTRACT

An attachment for a reel-to-reel film make-up bench is disclosed which is mounted to one end of the bench and provides a horizontal rotatable platter upon which film may be coiled and uncoiled. The attachment is controlled by a foot pedal which drives an electric motor to rotate the platter. A pair of spools are mounted to the attachment's frame for guiding film between the platter and a reel on the bench and a brake/clutch is provided which operates in response to the tension in the film running over one of the spools to control the platter speed so as to prevent the film overrunning.

9 Claims, 3 Drawing Sheets

ATTACHMENT FOR REEL-TO-REEL FILM MAKE-UP BENCH

FIELD OF THE INVENTION

The present invention is directed to an attachment for a reel-to-reel film make-up bench which allows the bench to make-up platter (horizontal) film coils from reel films, and vice versa.

BACKGROUND OF THE INVENTION

Motion pictures shown in theaters are often projected from films coiled on horizontal or flat platters. U.S. Pat. Nos. 3,780,959; 3,823,890; 4,169,566 and 5,174,516 describe such systems. It is also conventional to add to the front of a feature film, short film segments or "trailers" containing, for example, advertisements, coming attractions, public service announcements, or the like. Such trailers are usually 100 to 200 feet in length with a one to two minute running time. While many of the trailers are not changed very often, especially those related to greeting a viewer to the theatre, announcing the theatre policy on smoking, or advertising the food and drinks available in the lobby, the feature film is, on average, changed every two to three weeks. This means that in most theatres, the trailers must be removed from a feature length film and attached to a new feature length film. Also, trailers related to coming attractions are often changed on a weekly basis and these must therefore be removed and replaced from the film on a more frequent basis.

Make-up benches are commonly employed at theatres to aid in the splicing together and arranging of trailers. Such benches are conventionally set-up to operate on reel-to-reel films with two reels mounted to either end of the bench and include a reel drive and a hold back clutch or drag, and controls for operating the drive, as well as splicing and other film editing equipment. One such commercially available bench is the RTV 8900 made by Kelmar Systems, Inc., 284 Broadway, Huntington Station, New York, N.Y. 11746.

Trailers are also normally provided and stored in reel form and transferred to the platter of a platter system from a "mule" or a make-up table such as the table 50 shown in FIG. 1 of U.S. Pat. No. 3,823,890.

Thus, one conventional practice is to remove, at the platter projection system, the trailers to a reel, to move that reel to the make-up bench, to remove the undesired trailers and replace them with new trailers (e.g. the new "coming attractions" trailers). When this is done, the new "tray" of trailers is moved, in reel form, back to the platter system and attached by means of a mule.

One conventional approach is that the user remove the entire feature by removing the last reel first, then the second to the last, and so on. These reels, up to three each, would be wound on large 6,000 feet reels and then set aside to remove the appropriate trailers, or edit at the platter, using the mule to pull-off unwanted trailers and load on new ones using the make-up mode on the platter.

The feature previously removed would then have to be rewound onto a new trailer format. This process of taking the trailers off of and then replacing them back on an entire feature is a slow and laborious task.

If the projectionist would use the "rug" method, inserting on the last showing, a short length of foam rubber or a piece of a rug at the splice point between the trailers and the movie feature on the rewound platter, they still have to edit the trailers, pulling them off of a reel after moving them to an unused platter (no feature) or edit them using the mule and platter in make-up mode. This requires all new and old trailers, and the film splicer, to be carried to each theatre projection location and then back to the make-up bench again. The mule would have to be moved each time and reset to each new platter level. This process requires considerable winding time. The typical platter is 50 inches in diameter and turns 25–30 rpms, maximum. Switching from platter make-up and mule function to control the heads-on/tails-off and controlling the editing process, is a slow and repetitive process.

SUMMARY OF THE INVENTION

An attachment for converting a reel-to-reel make-up bench is provided which attachment includes a flat platter, means for rotating the platter at speeds above that of conventional projection platters while the rotating means are controlled by the operator and means for feeding film onto and off of the platter and off of and onto a reel mounted on the conventional table.

In accordance with another feature of the invention, there is provided an automatic braking device for slowing the speed of the platter in response to the sensed tension in the film being fed to and from the platter.

The attachment saves time in editing trailers together and centralizes work on editing the trailers at one location. It provides the finished set of edited trailers in a flat platter format which can be more easily added to feature films in that format.

The present invention is preferably practiced by having the attachment have a small or mini-platter (approximately half size—25 inches in diameter versus the usual, about 50 inch diameter, platter used in projection systems) and driving the platter at a speed that is significantly higher than that of the projection system. Common commercial projection systems rotate their platters at about 25 to 30 rpms while the attachment platter may be run at up to three times faster. The speed of the mini-platter is preferably controlled by a foot pedal switch.

There are many advantages to this process using the makeup bench attachment. Some of these advantages are: The film platter's ring and trailers are always in a flat format; the automatic braking, when slowing down the platter, gives the user better control; the foot operation speed control allows the user to have both hands free for the editing process; the drives on the make-up bench are always available; the mini-platter is less than one half in size and three times faster than the average platter; the mule is eliminated and the projectionist saves time in moving, setting-up the platters; and time and labor are saved.

With this attachment, all of the trailers—new trailers, re-usable trailers and expired trailers, can be stored and handled at the bench as it was with reel-to-reel make-up. The rewinding of trailer reel and rewinding of that reel on to platter center ring (flat format) may be eliminated.

DETAILED DESCRIPTION OF THE PREFERRED EMBODIMENTS

Figure 1:
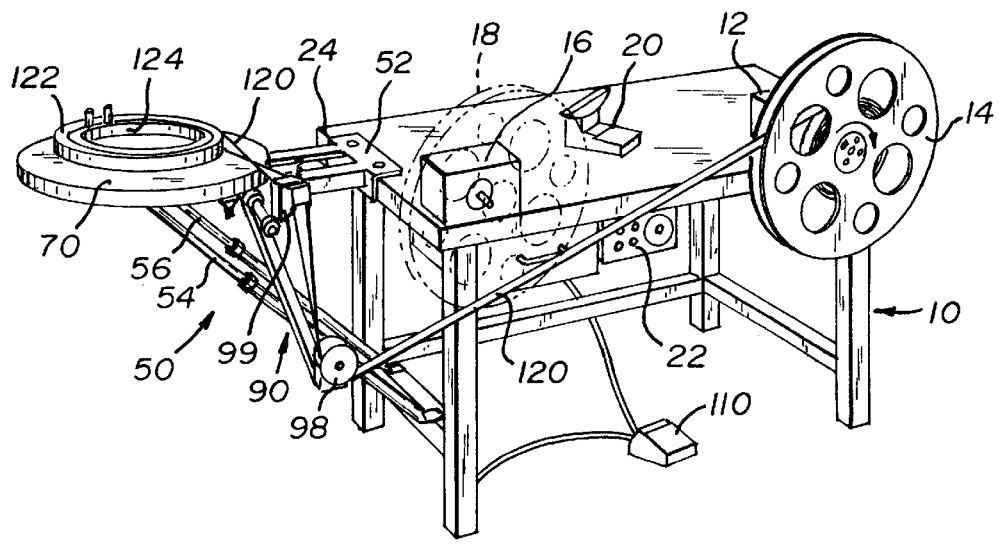
FIG. 1 is a perspective view of a conventional reel-to-reel make-up bench with the attachment of the present invention secured to the bench shown in the state of transferring a film between a reel and a flat state, with one conventional component, a reel, shown in dashed outline.

Referring to the figures, and initially to FIG. 1, there is depicted a more or less conventional make-up bench designated by the number 10. This bench 10 has a means 12 for mounting a film reel 14 at one end and means 16 for mounting a second reel 18 (which is shown in dashed outline) at its other end. Editing equipment 20 (splicer/cutter) is conventionally placed on the top of the bench 10 and controls 22 are provided for driving one or both of the reels 16 and 18. The bench 10 and its equipment as so far described, may be conventional and, therefore, for brevity, will not be detailed here.

In accordance with the principles of the present invention, however, an attachment 50 is provided for the bench 10. This attachment 50 has means for being secured to one end of the bench 10, namely an angle 52 which fits over the end edge 24 of the top of the bench 10 and a pair of adjustable length brace arms 54, 56 which extend to the bottom of the bench 10. The arms 54, 56 are pivotally secured to a frame 60 which also includes the angle 52.

Figure 3:
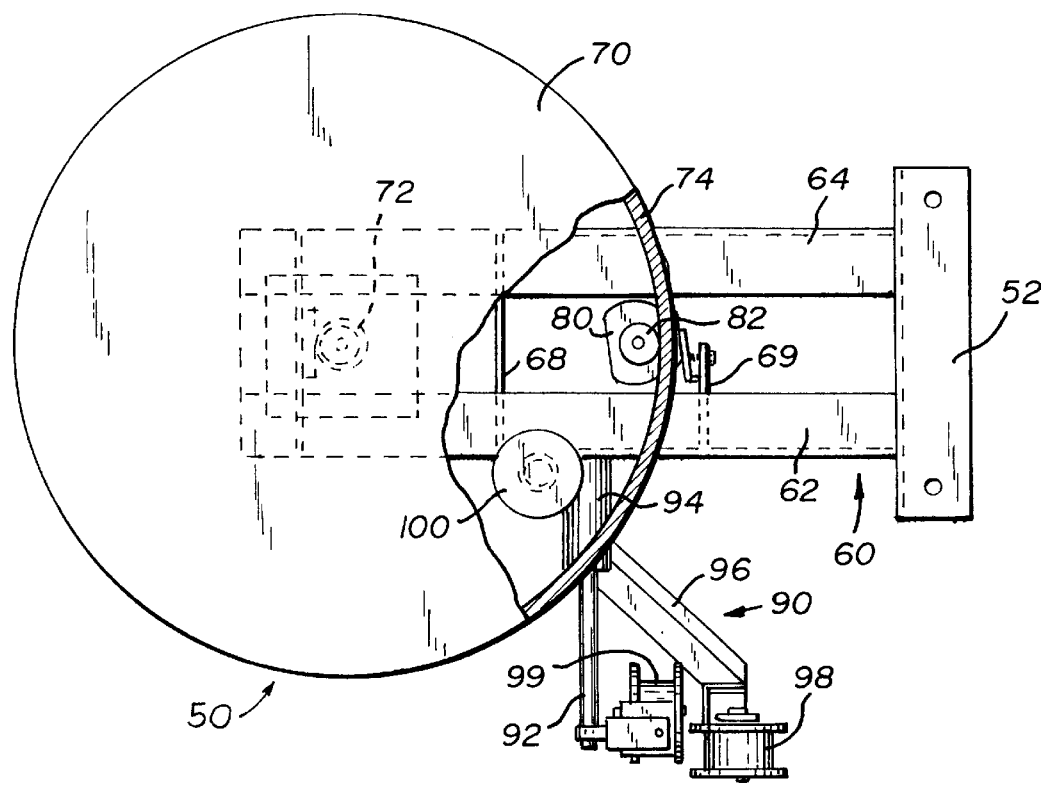
FIG. 3 is a top view of the attachment of FIG. 1 and FIG. 2, with parts broken-away to show hidden parts and with hidden internal parts shown in dashed outline.
Figure 4:
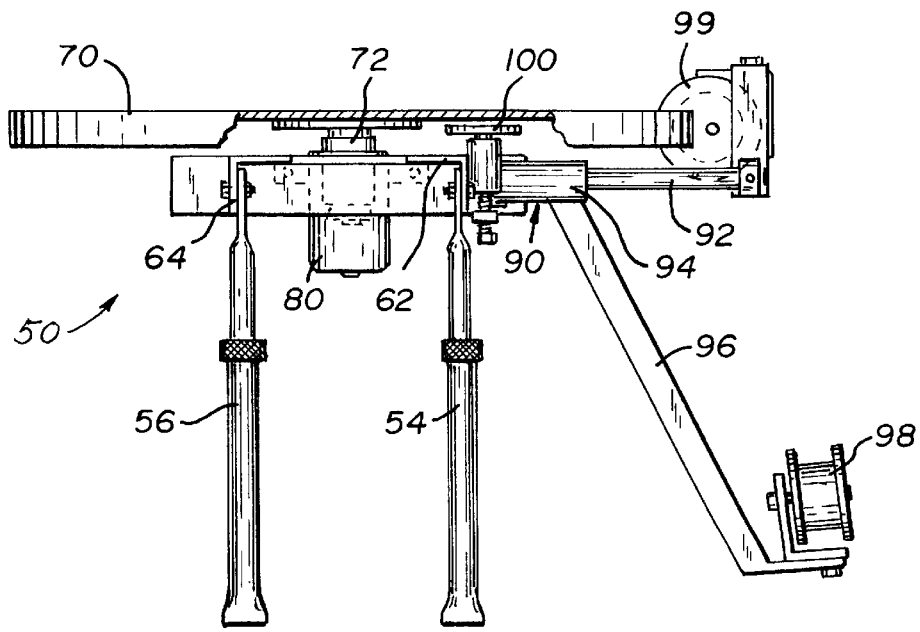
FIG. 4 is an end elevational view of the attachment of FIG. 1, FIG. 2 and FIG. 3, with parts broken-away to show hidden parts and with hidden internal parts shown in dashed outline.
Figure 5:
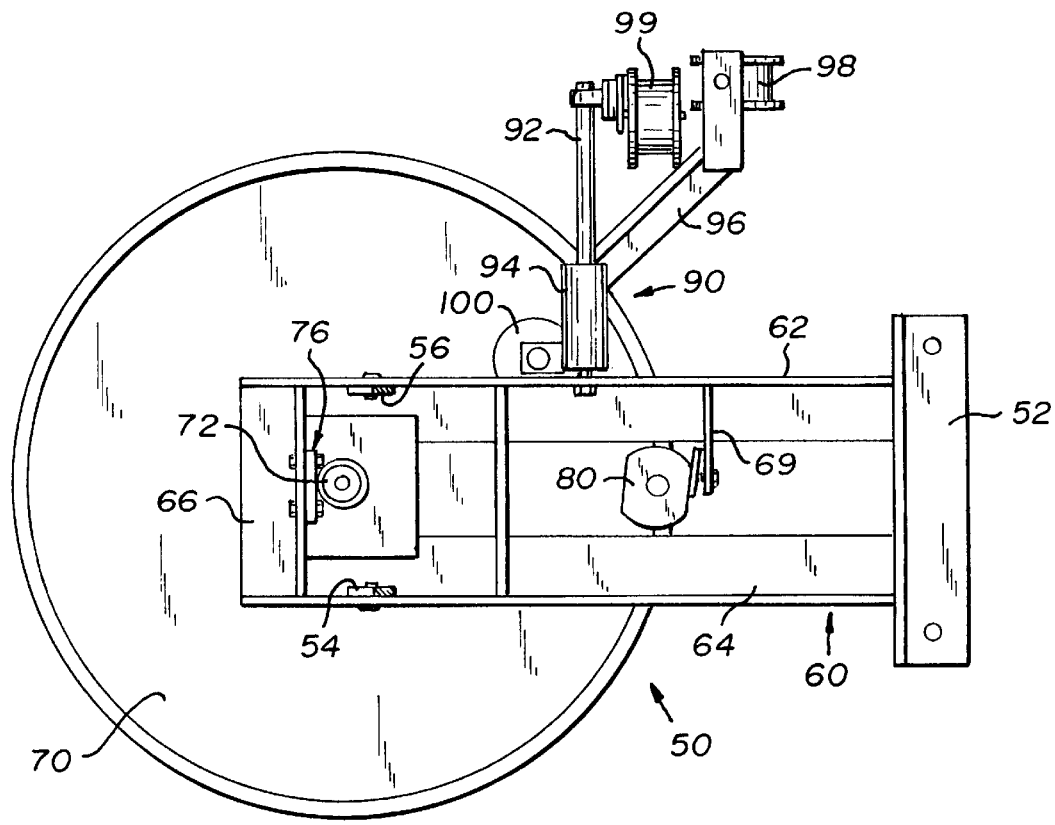
FIG. 5 is a bottom view of the attachment of FIG. 1, FIG. 2, FIG. 3 and FIG. 4, with parts omitted for clarity.
Figure 6:
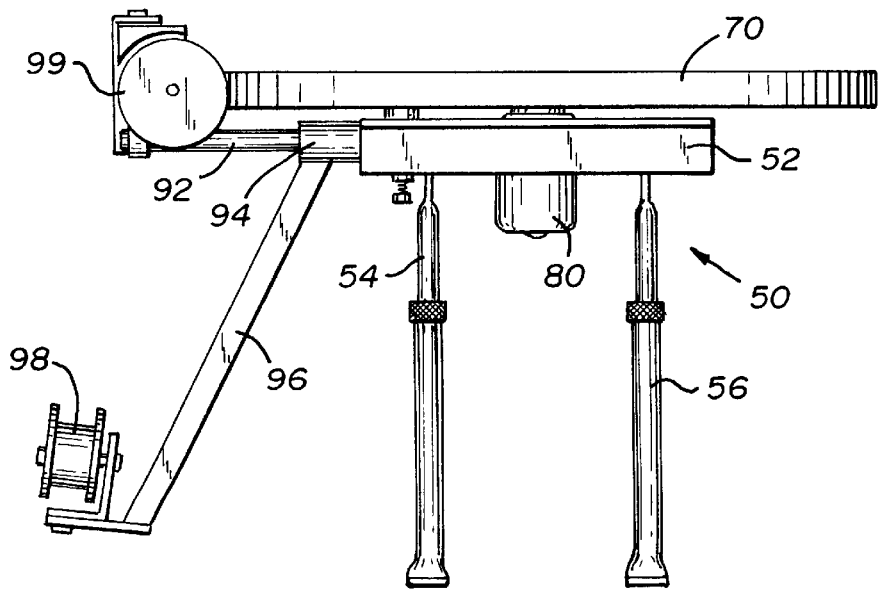
FIG. 6 is an elevational view taken from the bench side of the attachment of FIG. 1, FIG. 2, FIG. 3, FIG. 4 and FIG. 5.

The frame 60, as best shown in FIG. 3 and FIG. 5, includes a pair of horizontal parallel angles 62, 64 which are secured at one end to the angle 52 and have a second angle cross-member 66 at their other end. A transverse flat member 68 (FIG. 3) is provided between the angles 62, 64. All of these members are preferably welded or otherwise secured together to form a rigid frame 60.

The frame 60 is secured to the bench 10 by lag bolts, or other suitable fasteners through holes provided in the top of the angle 52 and at the flattened horizontal end of the arms 54, 56. The arms 54 and 56 are lockable, telescoping arms so that they can be adjusted to brace the frame 60 in a horizontal position and to adapt it to different benches.

The frame 60 serves to mount a rotatable platter, or mini-platter, 70 which is centrally mounted by a bearing 72 secured to a plate 76 which is welded or otherwise affixed to the angles 62, 64 of the frame 60. This mini-platter 70 is approximately half the size of a conventional projection film platter and of those shown and described in the aforementioned patent references. The frame 60 also mounts an electric motor 80 (FIG. 2, FIG. 3, FIG. 4, FIG. 5 and FIG. 6) which drives the platter 70 by means of a drive wheel 82 (FIG. 3) which contacts the inside of a depending circular flange 74 of the platter 70. This motor is chosen to drive the platter 70 at a speed of up to three times that of a conventional projection platter. The motor 80 is mounted to a bracket 69 that extends from the angle 62 of the frame 60.

Also mounted to the frame 60 is a combination film feed and platter brake unit 90. The unit 90 comprises a horizontal cantilever rod 92 secured at one end to the angle 62. Mounted for limited pivotable rotation on the rod 92 is a sleeve 94. Extending from the sleeve 94 are two arms, one elongated arm 96 which mounts a film feed spool 98 and a shorter arm 97 which supports an adjustable brake or clutch 100 that may selectively contact the bottom surface of the platter 70. Also mounted to the end of the rod 92 is a second spool 99.

Figure 2:
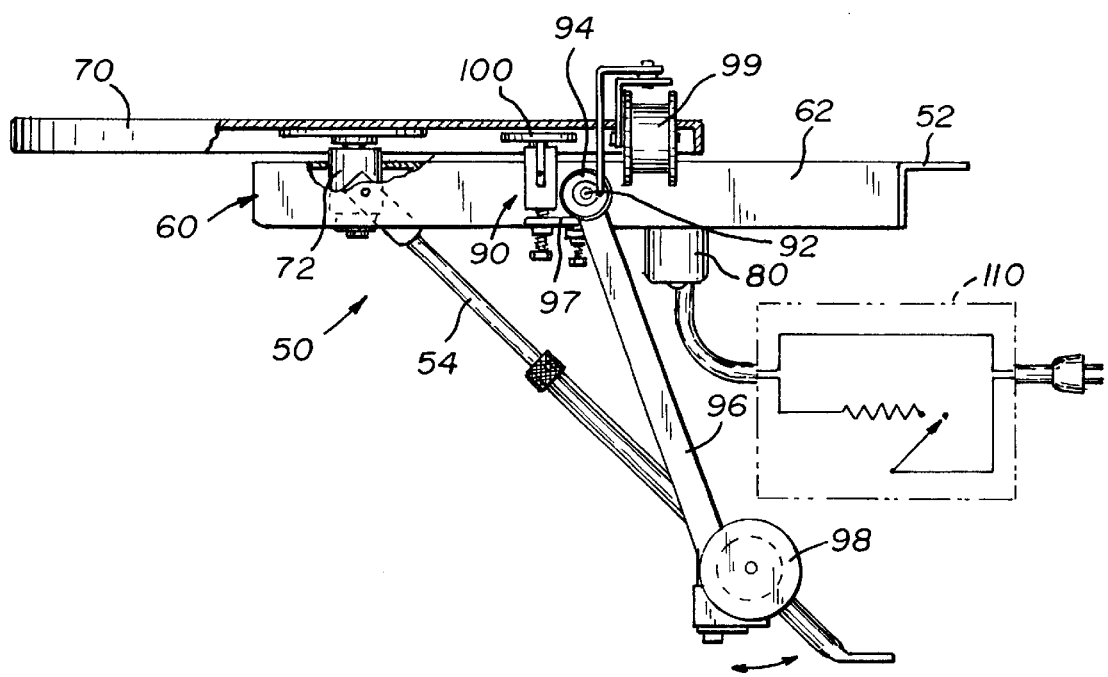
FIG. 2 is a side elevational view of the attachment of FIG. 1 with parts broken-away to show internal parts and hidden parts shown in dashed outline, and having a circuit diagram for one of the parts.

As shown in FIG. 1 and FIG. 2, while in use, the electric motor 80 is controlled by a foot pedal switch 110. The foot pedal switch 110 is a variable resistor (FIG. 2) that is controlled by depressing the switch. It is normally biased into the "off" position, but as it is depressed, the switch 110 supplies greater voltage and current to the motor 80. That is, by depressing the pedal of the switch 110, the motor 80 is caused to increase in speed while removing pressure from the pedal decreases the speed of the motor 80 and, thus, of course, of the platter 70. The film 120 is fed between a coil 122 around a ring 124 which is more or less conventional and releasably attached in the conventional manner to the platter 70 and a vertical reel 14 controlled and mounted in the conventional manner. The film 120 runs from the reel to pass under the spool 98 and upward to the spool 99 and thence to the platter 70.

In operation, the brake unit 90 serves to prevent overrunning of the film. When film is taken-off of the platter, the drive 12 is operated to turn the reel 14 clockwise. This drives the film from under the spool 98. The tightening of the film 120 across the spool 98 rotates the arm 96 and draws the brake 100 away from the platter 70 which then turns. When the reel 14 decelerates, (or the platter 70 starts to overrun the speed of the reel 14) the slack in the film 120 running from the spools 98 and 99 allows the arm 96 to rotate slightly in the clockwise direction (as seen in FIG. 2) and applies the brake (or clutch) 100 to the platter 70. This slows the platter and prevents an excessive overrun of the film 120 which might otherwise cause the film to slip-off of the spools and perhaps contact foreign materials or dirt on the floor. The brake works automatically during normal editing, without any additional operator attention.

Similarly, when the film 120 is being pulled-off the reel 14 by operating the drive 12 and the reel decelerates, the slack in the film causes the arm 96 to pivot clockwise and engage the clutch/brake 100 to also slow the platter 70 and tighten the film 120.

After the last showing of a feature, a trailer change becomes necessary. Before this is done, often a "rug" (e.g. a strip of foam) is inserted around the film wound onto the center ring, at the point where editing is to begin. After a feature is completed, the rug is removed and, in the space provided, the splice separated, and the trailer film clamped manually to a platter's center ring. When this is completed, the trailer film coil and the ring are taken to the platter 70 of the attachment 50.

The editing process begins by removing the unwanted trailers using the make-up bench attachment drive, and then winding them tail-in/heads-up on a core for return or re-use. The new trailers are then spliced to the film on the mini-platter 70 using the platter drive to wind them on, head-up/tails-out.

The completed new set of trailers, with the ring, are then returned to the large platter of the film projection system, and replaced in before the feature film, and spliced once at the remote location. The new format of trailers are now ready for the next showing.

A prototype of the accessory 50 has been built and tested and proved to work well. This prototype was approximately 32 inches long by 22 inches wide by 18 inches high, with a platter of 22 inches in diameter. The motor 80 was a sewing machine motor, model number YM-40 and the spools 98 and 99 were 35 mm film roller made by Christie, model number AW3R. The rod 92 was approximately ⅝ inch in diameter and 9 inches long. The sleeve 94 was made up of a steel sleeve 3 and ¼ inches in length and having an inside diameter of 1 and ⅜ inches and an outside diameter of 1 and ⅝ inches.

The brake/clutch 100 was made up of 3/16 inch steel disc 2 and ½ inches in diameter, covered with ⅛ inch thick brake pads welded to a ⅝ inch solid shaft 1 and ¾ inch long with a 3/16 inch pin and travels in a 7/32 inch slot in the brake sleeve ⅝ inch inside diameter by ¾ inch outside diameter by 2 inches welded to the frame 60.

The frame 60 included steel angles 2 inches by 2 inches with angle 52 being 11 inches long, angles 62 and 64 being 20 and ½ inches in length and cross member 66 is 7 and ⅛ inches long.

While particular embodiments of the invention have been shown and described, it will be obvious to those in the art that changes and modifications may be made without departing from the invention and, therefore, the aim in the appended claims is to cover all such changes and modifications as fall within the true spirit and scope of the invention.

I claim:

1. An attachment for a film make-up bench having means for mounting and means for driving at least one vertical reel for film, said attachment comprising:

a frame;

a horizontal film platter mounted on said frame for rotation thereon, said platter being adapted to support a coil of film, to transfer the film to the at least one vertical reel, and to receive the film from the at least one vertical reel;

drive means coupled to said platter for driving said platter;

means connected to said drive means for controlling said drive means; and means for guiding the film between said platter and the at least one vertical reel on the mounting means of the bench; and brake means coupled to said guiding means for engaging said platter when slack is present in the film as the film is transferred to and from said platter, said brake means disengaging said platter when tension is present in the film as the film is transferred to and from said platter;

whereby said attachment is adapted to enable the film to be transferred between the at least one vertical reel and said platter and edited at the bench by an operator controlling said drive means and the means for driving the at least one vertical reel on the bench.

2. The attachment of claim 1 wherein said attachment further comprises includes means for attaching and detaching said attachment as a unit to the bench.

3. The attachment of claim 1 wherein said brake means comprises a pivotable arm, a spool mounted to said pivotable arm and over which the film is run, and a brake that pivots into contact with said platter as the tension in the film running over said spool decreases and is pivoted away from said platter as the tension in the film running over said spool increases.

4. The attachment of claim 1 wherein said controlling means is manually operable.

5. The attachment of claim 1 wherein said platter can be driven by said drive means at speeds of up to at least 60 rpms.

6. The attachment of claim 5 wherein said controlling means allows for the speed of said platter to be manually varied over a range of 0 to at least 60 rpms.

7. The attachment of claim 5 wherein said platter is about 25 inches or less in diameter.

8. The attachment of wherein said controlling means allows for the speed of said platter to be manually varied over a range of 0 to at least 60 rpms.

9. An attachment for a film make-up bench having means for mounting and means for driving at least one vertical reel for film, said attachment comprising:

a frame, a horizontal film platter mounted on said frame for rotation thereon, said platter being adapted to support a coil of film, to transfer the film to the at least one vertical reel, and to receive the film from the at least one vertical reel;

drive means mounted to said frame for driving said platter;

means connected to said drive means for controlling said drive means said controlling means, being manually operated and functioning to selectively drive said platter;

brake means pivotably attached to said frame for preventing overrunning of the film when being transferred between said platter and the at least one vertical reel, said brake means having first and second portions oppositely disposed relative to an axis of rotation of said brake means, said brake means engaging said platter when rotated in a first direction as a result of slack present in the film, said brake means disengaging said platter when rotated in a second direction as a result of tension being present in the film; and means for guiding the film between said platter and the at least one vertical reel on the mounting means of the bench, said guiding means comprising a first guide member mounted to said first portion of said brake means, said guiding means comprising a second member mounted to said second portion of said brake means, said first and second guide members causing said brake means to rotate in response to slack and tension in the film;

whereby said attachment is adapted to enable the film to be transferred between the at least one vertical reel and said platter and edited at the bench by an operator controlling said drive means and the means for driving the at least one vertical reel on the bench.

\* \* \* \* \*